Dec. 1, 1964   R. J. BARBER   3,159,396
DOCUMENT HANDLING APPARATUS
Filed Dec. 12, 1962   6 Sheets-Sheet 1

INVENTOR.
ROBERT J. BARBER.
BY
*J.P. Santo*
ATTORNEY.

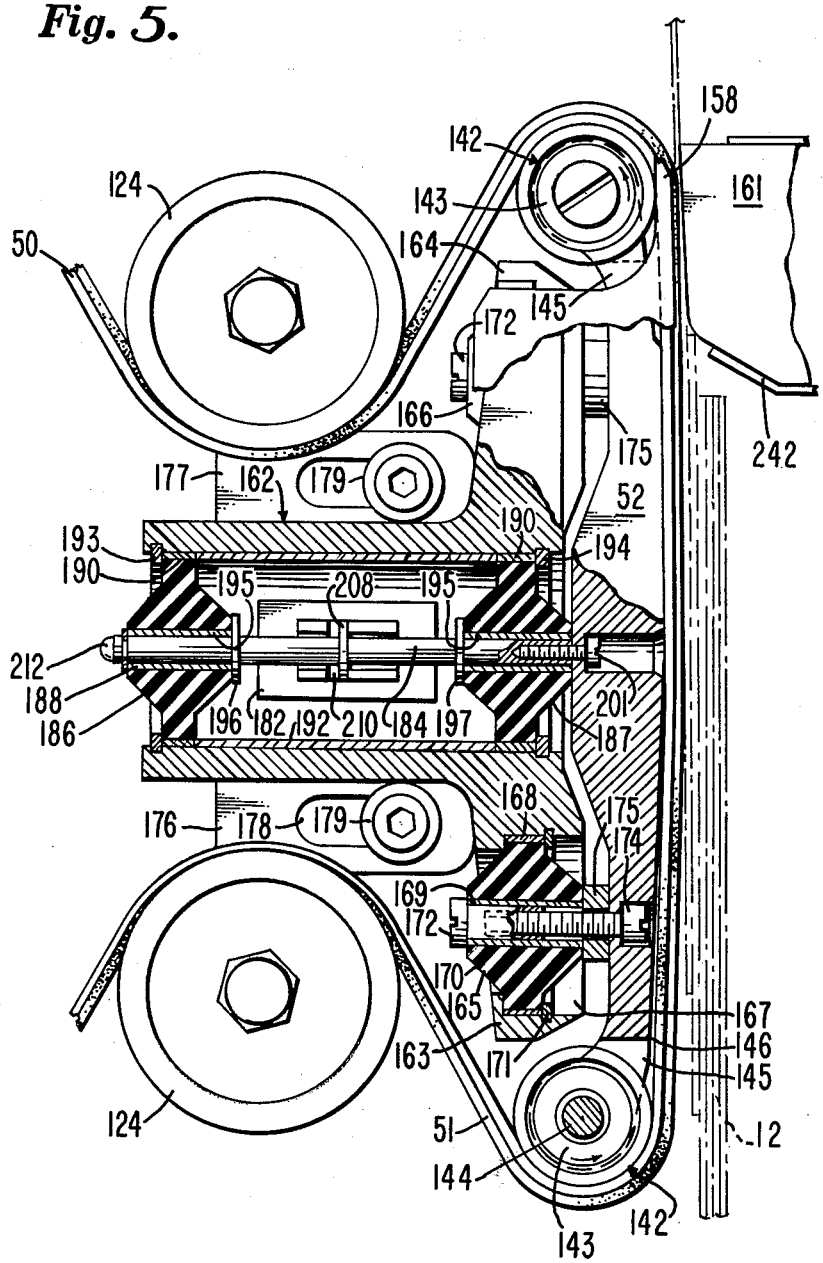

Dec. 1, 1964   R. J. BARBER   3,159,396
DOCUMENT HANDLING APPARATUS
Filed Dec. 12, 1962   6 Sheets-Sheet 5

INVENTOR.
ROBERT J. BARBER.
BY
*J P Santo*
ATTORNEY.

Dec. 1, 1964

R. J. BARBER 3,159,396

DOCUMENT HANDLING APPARATUS

Filed Dec. 12, 1962

INVENTOR.
ROBERT J. BARBER.

BY

J. P. Santo
ATTORNEY.

United States Patent Office 3,159,396
Patented Dec. 1, 1964

3,159,396
DOCUMENT HANDLING APPARATUS
Robert J. Barber, Northville, Mich., assignor to Burroughs Corporation, Detroit, Mich., a corporation of Michigan
Filed Dec. 12, 1962, Ser. No. 244,030
14 Claims. (Cl. 271—34)

This invention relates to document handling apparatus and, more particularly, to a friction operated feeder for feeding of documents, such as punched tabulating cards.

The invention is specially suited for edgewise, serial feeding of tabulating cards upon demand and provides positive, even and reliable feeding of such cards one at a time at high speed and at variable rates of demand, features unattainable by feeders using vacuum or clutching and braking systems.

The invention has for its general object to provide a document feeder in apparatus of the above character for positive, even and reliable feeding of cards upon demand one at a time at a high rate of speed and variable rates of demand.

A specific object is to provide a document feeder apparatus having a friction feed element that is held spaced from the document in a non-feeding position and is moved upon demand in a direction to frictionally engage and feed the document in a feeding position.

A related object is to provide a friction feeder of the above character having a continuously traveling friction belt movable into and out of engagement with a document by a power operated actuator on demand.

Another related object is to provide a reciprocable power actuator in a feeder employing a continuously traveling friction feed belt, a portion of which is backed by a rigid element movable by the actuator in a direction to provide firm, positive contact with a card over a substantial portion of the length of the card.

Another object is to provide a card feeder apparatus in accordance with the foregoing in which the feed belt establishes firm, positive contact with portions of the card between perforations in the card.

Another object is to provide a solenoid actuated card feeder having an endless friction feed belt that is held spaced from the card by the relative positions of a card stripper or guide plate and the peripheral face of the belt.

A further object is to provide a solenoid actuated card feeder in accordance with the above in which the relative positions of the stripper plate and card contacting face portion of the feed belt are adjustable.

Various other features and advantages of the invention will appear more fully from the following detailed description and drawings, wherein:

FIG. 5 is an enlarged view with parts broken away of a portion of the feeder section of FIG. 1 and illustrated in a feeding position;

Figure 1:
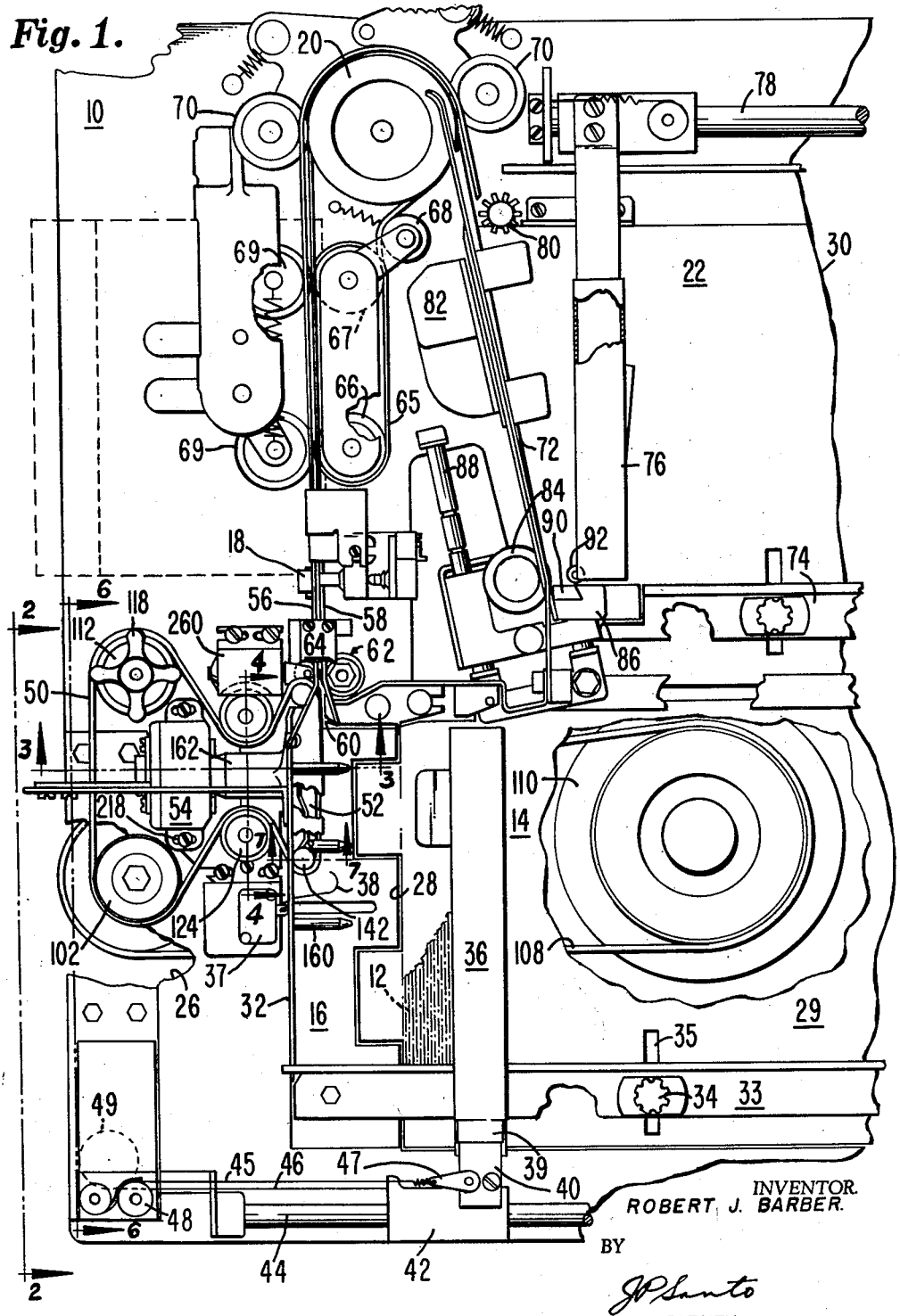
FIG. 1 is a plan view on a reduced scale and with parts broken away of a card handling apparatus incorporating the friction feeder of the present invention.

Referring to the drawings, a portion of a document handling card feeder and reader mechanism 10 is shown in FIG. 1 in which a stack 12 of punched cards is supported edgewise in a feeder hopper 14 and successively presented to a feeding station 16 from which the cards are fed singly on demand past a reading station 18 to a turn around guide roller 20 from which they are stacked in a stacking hopper 22 in the same order in which they were fed. The above assemblies are mounted on a stationary base plate or casting 26 having rigidly fixed thereto and elevated slightly thereabove a stationary hopper floor plate 28 and a pair of vibratable floor plates 29 and 30 which are relatively movable with respect to the stationary floor plate. Although shown as extending in horizontal planes for purposes of drawing convenience, the several plates are disposed in gradually rearwardly rising planes inclined at about 21½ degrees to the horizontal from the front to the rear of the structure to facilitate loading and unloading of cards herein and for card jogging and alignment purposes.

Figure 2:
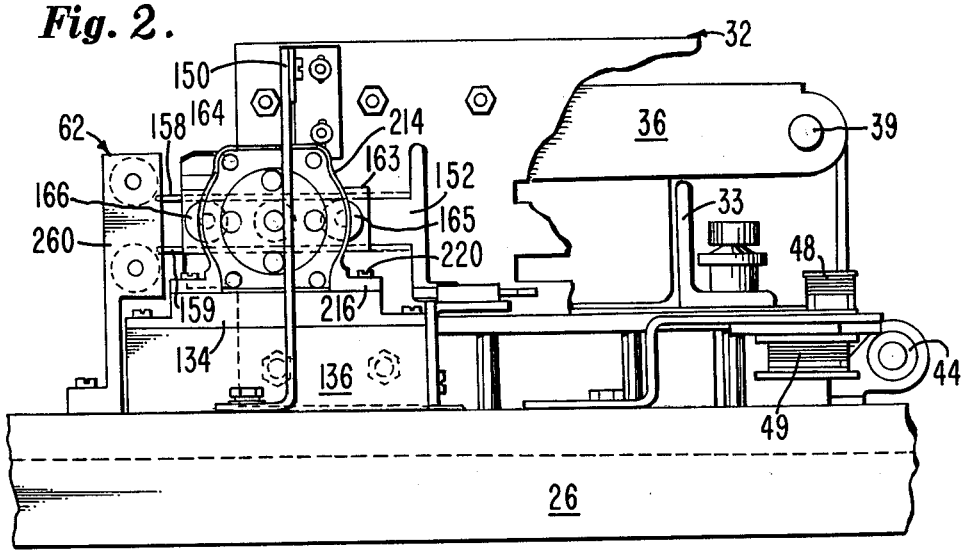
FIG. 2 is an elevation view taken in the direction 2—2 of FIG. 1 with some parts omitted for clarity.

The feed hopper 14 includes the stationary and movable floor plates 28 and 29; a left end wall formed by an upstanding rearwardly extending stripper or guide plate 32; a laterally extending edge guide 33 that is slidably mounted on and releasably secured by clamps 34 in elongated slots 35 in the movable floor plate for adjusting the size of the feed hopper to accommodate different length cards on different card runs; a rearwardly extending pusher plate 36 overhanging the hopper edge guide and floor plates; and an empty hopper switch 37 having a card sensing actuator 38 projecting through an opening in the stripper plate. The pusher plate is pivotally mounted at 39 for insertion into an extraction from the hopper and is supported from an upstanding bracket 40, which is secured to a bored pilot or bearing block 42. Block 42 is coaxially slidably received on a laterally extending cylindrical guide tube 44 that is mounted on the base casting 26, as shown in FIG. 2. The pusher plate is urged leftwardly toward the stripper plate by a vertically spaced pair of horizontally extending cables 45, 46 connected respectively between the block 42 and a lug 47 on bracket 40 and to coiled spring tensioning devices 48 and 49 which are mounted from the base plate and are tensioned as the pusher plate 36 is moved manually rightwardly to receive a stack of cards.

The feeder 16, which will be described in greater detail later, includes a constantly driven, rubber surfaced, endless feed belt 50. The outer surface of the belt has integrally formed thereon a vertically spaced pair of ribbed projections 51 each approximately ⅛ inch in width separated by a groove of the same width and is mounted or positioned relative to the card so that the ridges contact the card between adjacent rows of perforations therein, as later described.

As shown in FIG. 1, the belt passes over one face of a belt back-up member or platen 52 which is displaced behind, but is movable upon demand from a solenoid actuator assembly 54 past, the stripper plate 32 to position the belt for frictional engagement with the forwardmost card of the stack. The continuously traveling belt drives the card edgewise and rearwardly between a pair of upstanding guide plates 56, 58 and past a separator and throat block 60 into the bight of a card pull-out, accelerating drive roller assembly 62 and a photo-optical card detector 64. The detector 64 detects the presence of the card and de-energizes the solenoid actuator to retract the belt carrying platen from the card stack. From the pull-out drive roller assembly, the fed card is transported between the guide plates by a cotton belt 65, drive roller 66 and cooperating idler and belt tensioning rollers 67 and 68, and rubber faced pressure rollers 69 and 70 past a photo-optical card reading station 18 and then around the turn around guide roll 20 from which the card is directed into the card stacker 22.

The stacker 22 includes the floor plate 30, which is resiliently mounted from the base plate 26 in the same plane as, but located rearwardly and above, the movable feed hopper floor plate 29, and is vibrated in a reciprocating rectilinear path by an electro-magnetic jogger (not shown). A side wall of the stacker is defined by an extension 72 of one of the upstanding stationary guide plates serving as a stationary backing plate. The opposite wall of the stacker is defined by a laterally extending, rearwardly located edge guide 74 similar to the L-shaped forward edge guide 33 of the hopper and is likewise adjustably mounted on the stacker floor plate to accommodate different length stacks of cards for different card runs. A movable back-up or follower member 76, corresponding to the pusher plate 36 in the feed hopper, is similarly mounted on a rearwardly located laterally extending guide tube 78 and is resiliently tensioned against the stacked cards moving the follower rightwardly to permit the accumulation of the cards being fed into the stacker.

Positioned in the entrance of the bin stacker is a constantly driven, vertically mounted, nylon pinion or paddle wheel 80 which serves to entrain the trailing edge of an incoming card between the teeth thereof and to deflect it rightwardly into the accumulated stack. As the card enters the stacker, the advanced forward portion of the card is deflected toward the stack by a continuous air blast from a blower (not shown) directed through a manifold shown at 82. At the lowermost or forward end of the stacker is a stainless steel feed roller 84 which projects through the backing plate 72 and rotates clockwise for the purpose of moving the forward portion of an incoming card down against an end wall member 86 forming a forward end wall of the stacker bin. The member 86 is received in a cut-out portion of the edge guide 74 and is releasably positionable along a rod mounting assembly 88. Mounted in the rearwardly extending face of the end wall member is a resilient snubber element 90 which cushions the impact of the forward leading edge of the card as it is driven into the stacker and prevents edge damage thereto.

The movable follower member 76 includes a vertically extending rubber surfaced, idler roller 92 at the lower, left forward end thereof. The follower member is of releasable locking and telescoping construction adjustable to accommodate different lengths of card stacks, such as 51, 60, 66 and 80 column tabulating cards, as indicated by the line or bar graduations thereon and on the movable floor plates 29 and 30 and the grooved notches on rod 88, upon the adjustment of the forward and rearward edge guards 33 and 74 and the stacker end wall member 86, as previously mentioned.

Figure 6:
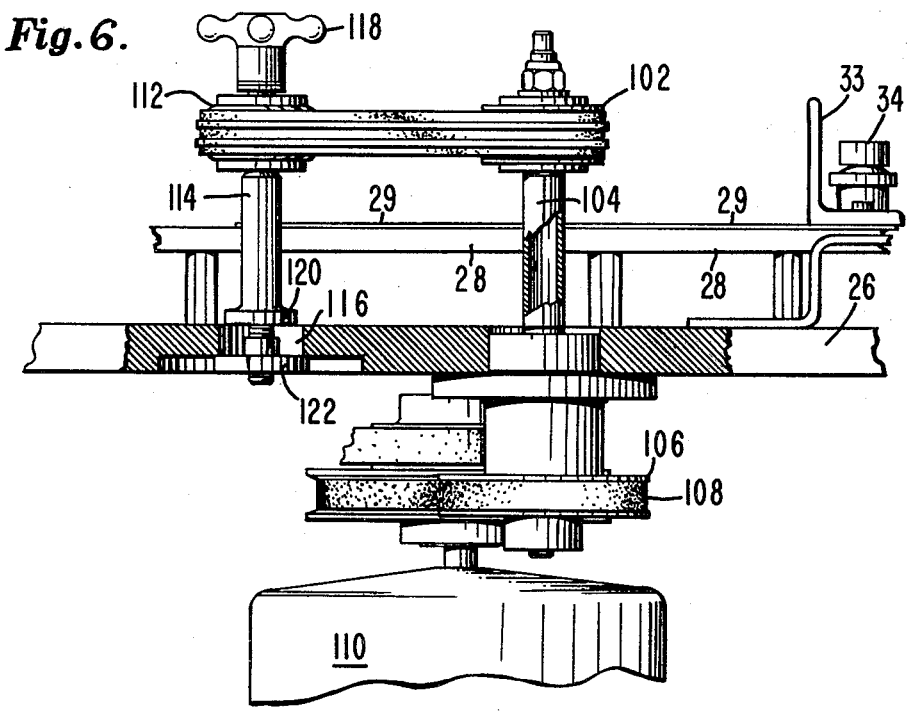
FIG. 6 is a sectional elevational view with parts broken away and taken in the direction 6—6 of FIG. 1.

Turning now to a more complete description of the friction feeder mechanism of the feeding station 16 of the present invention, the feeder mechanism includes the ribbed or grooved, rubber feed belt 50 which is driven in a counterclockwise direction from a flanged drive pulley 102 secured to a vertically extending tubular shaft 104 over-journalled in the base casting 26, as shown in FIG. 6. The shaft portion below the casting mounts another pulley 106 which is constantly driven by belt 108 from an electric motor 110. Spaced rearwardly of the drive pulley 102 is a crowned idler and belt tensioning pulley 112 rotatably mounted on an upstanding shouldered post 114 that is adjustably laterally positionable in a slotted portion 116 of the base casting. Post 114 is releasably clamped to the base casting by a fingered knob 118 at the upper end of the post, the integrally formed shouldered portion 120 of the post and a bossed or T-shaped lug 122 threadably received on the threaded lower end thereof.

FIG. 6 also illustrates the rigid mounting of the stationary hopper floor plate 28 above the base casting. The movable hopper floor plate 29, which is located behind the stationary floor plate in this view, is raised just slightly above the stationary floor plate by approximately 0.030 inch, to provide a slight downward step therefrom to the stationary plate to aid in jogging and feeding the cards toward the stripper plate. The plate 29 is resiliently mounted through shock mounts to the base casting for relative oscillatory, limited vertical and horizontal, movement by an electromagnet (not shown) mounted at a compound angle between the base plate and the movable floor plate. Depending upon the character of the documents being fed or where necessary, the stationary hopper floor plate could be of porous bronze construction for the purpose of permitting air to be blown upwardly therethrough to aid in riffling and separating the documents in the stack.

Figure 4:
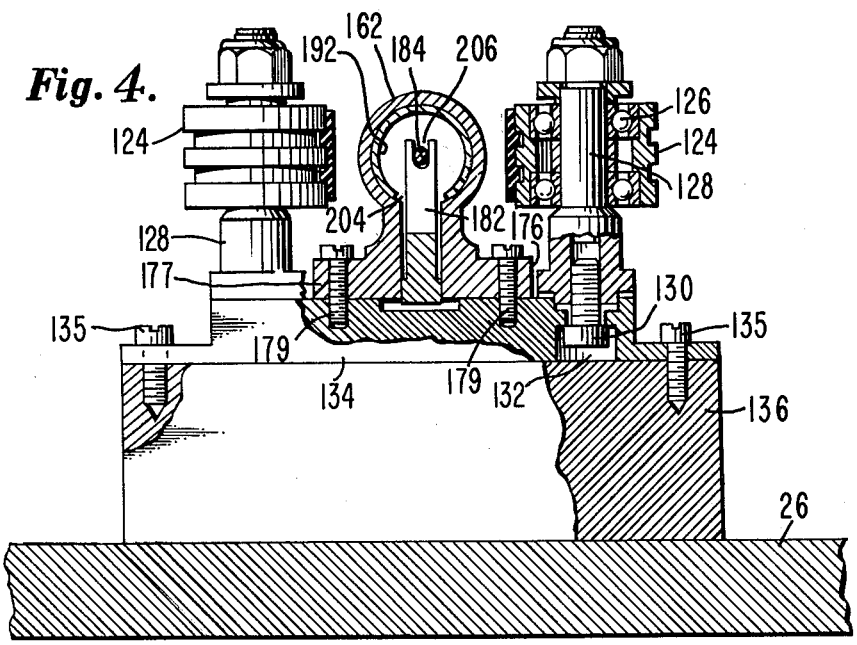
FIG. 4 is an enlarged sectional view with parts broken away taken in the plane 4—4 of FIG. 1.

Located inwardly and to the right of the drive pulley 102 and crowned pulley 112 is a pair of forwardly and rearwardly spaced reverse idler rollers as 124 of ribbed configuration corresponding to the ribbed configuration of the feedbelt. As shown in FIG. 4, the idler rollers 124 are mounted by anti-friction bearings 126 on upstanding vertical posts 128, which are secured by shouldered machine screws 130 in openings 132 provided in a sub-plate 134. Sub-plate 134 is releasably secured by cap machine screws 135 to a pedestal block 136 bolted to the base plate 26.

Figure 7:
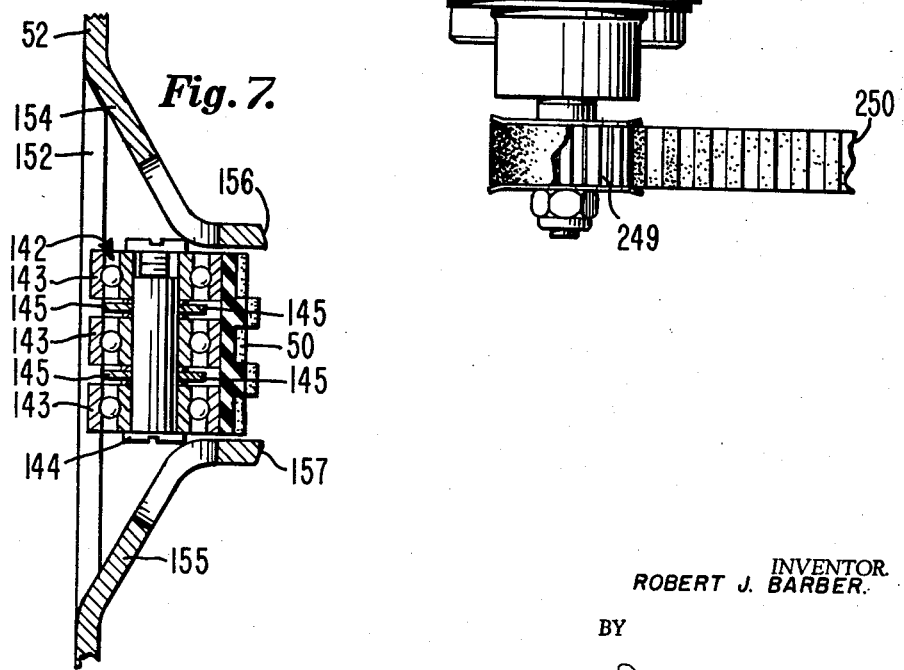
FIG. 7 is a sectional view taken in the plane 7—7 of FIG. 1.

From the reverse idler rollers 124, the feed belt 50 passes around a pair of forwardly and rearwardly spaced idler roller assemblies 142 carried by and rotatably mounted on the movable platen. As shown in FIGS. 5 and 7, each idler roller assembly comprises a tiered stack of anti-friction roller bearings 143 mounted on a pin as 144 fixed and extending vertically through a pair of integrally formed, vertically spaced ears 145 on each end of the elongated platen 52 with the rotatable outer races of the bearings contacting the back surface of the belt. The platen thus provides a rigid backing surface for the reach of the belt extending between the idler roller assemblies at the extremities of the platen shown as receding slightly from the belt with a noticeable clearance 146 between the face 147 of the platen and the belt along the forward half of the platen, as indicated in FIG. 5. By mounting the idler roller assemblies 142 on the movable platen instead of on fixed axes, the portion of the belt extending from the reverse idlers 124 is bodily translated or moved laterally with the platen and in the retracted position of the platen will be displaced sufficiently a controlled amount behind the stripper plate to avoid any contact with any cards in the stack that might be warped, bent or curled toward the belt and that might otherwise be fed thereby.

Figure 3:
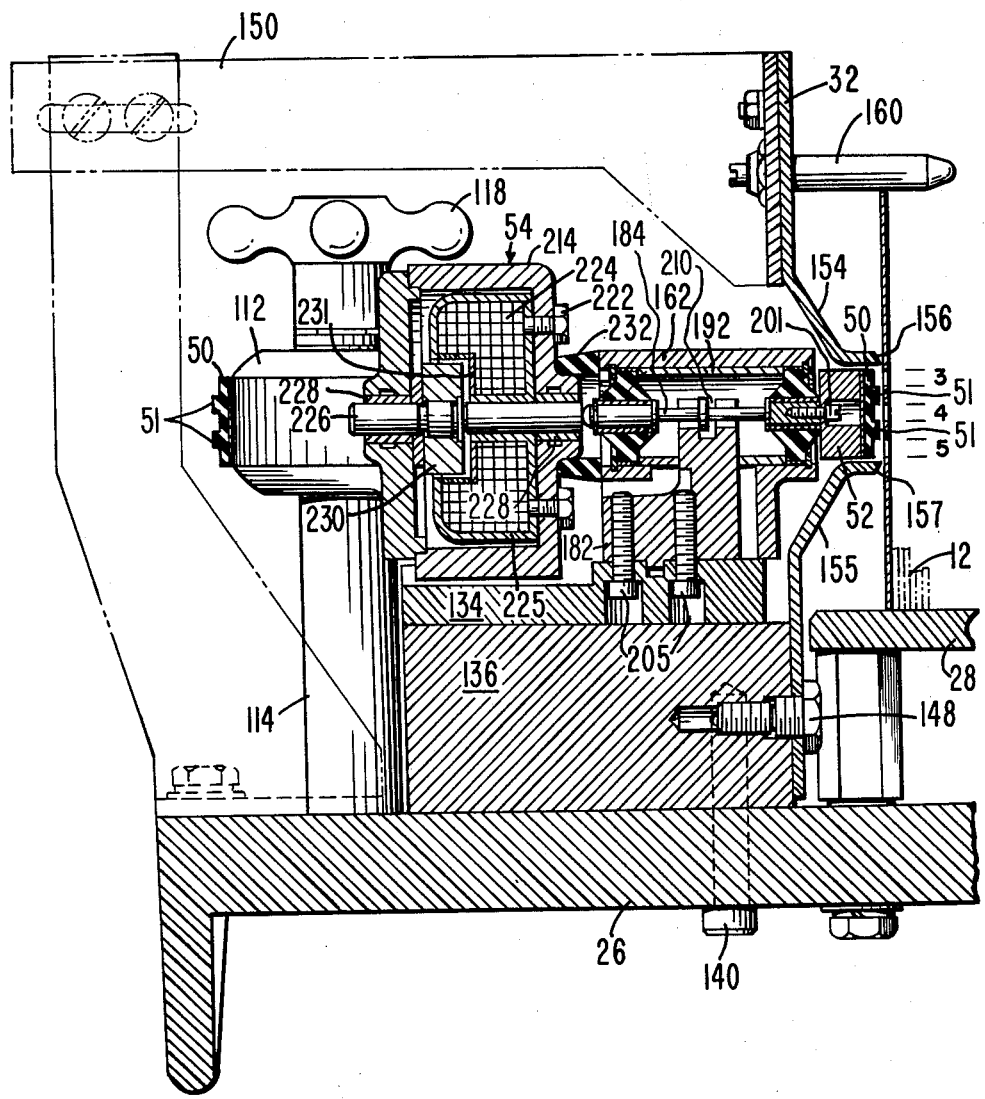
FIG. 3 is an enlarged sectional view taken in the plane 3—3 of FIG. 1.

The position of the platen 52 relative to the stripper plate 32 is shown in FIG. 3 in which the stripper plate is shown fastened to the pedestal 136 by bolts 148 and to a horizontal adjustable, L-shaped bracket assembly 150 that is fastened to the base plate. The stripper plate includes an elongated slot or opening 152 therein defined between a spaced pair of converging and longitudinally reawardly extending flange portions 154, 155 struck out of the plate. The vertically spaced forwardmost edges 156, 157 of the flanged portions of the stripper plate overhang the stationary hopper floor plate 28 and are located in a vertical plane in advance of the normal position of the forward face of the feed belt and platen. The feed belt and platen are located in the opening 152 and leftwardly behind the flange edges 156, 157 so as to be spaced from the forwardmost card of the card stack urged against and contacting the flange edges of the stripper plate.

Located above the upper flanged portion 154 of the stripper plate are several laterally extending aligning pins 160 spaced longitudinally of and fastened to the stripper plate a distance above the hopper floor to engage the upper longitudinal edges of the card stack to maintain the cards in correct vertical registration position while being presented to the feed belt. The belt is adapted to contact a substantial portion of the length of the card and is supported above the hopper floor plates a distance such that the belt ridges 51 contact the face of a 12-row tabulating card between adjacent rows of perforations therein, shown in FIG. 3 as between card rows 3, 4, and 4, 5, respectively.

The flanged portions 154, 155 of the stripper plate extend rearwardly beyond the card stack providing rear extensions or rails shown at 158, 159 in FIGS. 2 and 5 that form with the adjacent slightly inclined face of the adjustable separator block 161 at the feed exit of the hopper a throat gap slightly greater than the thickness of one card. The rearwardly located idler roller assembly carried on the platen is positioned in relation to the face of the platen to allow the feed belt to recede away from the gap as it passes around the roller 142 when the platen is retracted. It will be noted that the reach of the belt between and around the idler roller assemblies 142 extends beyond the card stack and into the throat gap area. Upon actuation of the platen to engage the belt with the stack, the face of the belt at the rearwardly located end of the platen projects slightly beyond the edge of the upper rail extension 158 of the stripper plate and into the throat gap to effectively separate the first card from the stack while still positively feeding it in this area, thereby preventing any jams that might otherwise occur. As a further aid to effectively separate the cards, the separator block may be composed of a cellular urethane foam friction material slightly yieldable when the card is pressed thereagainst by the rearward reach of the feed belt to provide a scrubbing and retarding action on the adjacent back face of the card and allow only one card to pass therethrough. In the feeding position of the belt, the throat gap thickness is reduced slightly to a width just less than the thickness of one card, which is driven therethrough by the positive grip and feed of the belt slightly compressing the resilient face of the separator block. The separator structure is the separate subject matter disclosed and claimed in copending application S.N. 244,108, filed December 12, 1962, of common ownership herewith.

The mounting and support for the platen is shown in FIGS. 3, 4 and 5 and includes a shock mount and push rod housing 162 located behind or to the left of the platen. The housing is of generally hollow cylindrical formation having at one end thereof a pair of integrally formed, bored vertical flanges 163, 164 each of which contains in the bore 167 thereof a resilient shock mount 165, 166 to which the platen is fastened near its extremities as shown in FIG. 5. Each shock mount includes an outer metallic ring 168 concentrically disposed about a central sleeve or inner ring 169 with rubber or other suitable resilient material 170 bonded to the adjacent surfaces of both rings and is retained in the corresponding bored flange by a snap ring 171. The inner ring or sleeve receives a cap screw as 172 having a threaded opening in one end thereof to receive a threaded screw 174 having a spacer 175 thereon and by which the platen is secured at its ends to the mounts 165, 166 in the housing. Projecting beyond the base or lower end of the shock mount housing is a pair of integrally formed, base flanges 176, 177 each having an elongated adjusted slot as 178 therein for reception of a cap screw as 179 through which the housing is adjustably mounted and releasably secured to the sub-plate 134 on the pedestal 136.

Located internally of the housing 162 is an upstanding stop and guide block 182 for a resiliently mounted elongated pin or push rod 184 passing centrally through the inner sleeve ring 188 of each of a laterally spaced pair of inner shock mounts 186, 187 similar to the shock mounts 165, 166 described above. An inner spacer sleeve 192 extends between the outer rings 190 of the inner shock mounts, and a spaced pair of outwardly located snap rings 193, 194, which are received in inner annular grooves in the ends of the housing, are provided to retain the shock mounts therein after the mounts have been received over the ends of the push rod and positioned with the inner rings 195 of the inner shock mounts contacting a respective one of a longitudinally spaced pair of shoulders 196, 197 integrally formed on the rod.

The right end of the push rod 184 abuts the central portion of the platen 52 and has a threaded opening therein to receive a threaded machine screw 201 by which the central portion of the platen is positioned and secured to the push rod and drawn against the shock mount 187. The lowermost portions of the spacer sleeve 192 and housing 162 are slotted as shown at 204 in FIG. 4 to permit the stop and guide block 182 to pass therethrough. The stop block extends through the elongated slot in the base portion of the housing 162 and is secured at its lower end to the sub-plate 134 by machine screws 205, as shown in FIGS. 3 and 4. The upper end of the guide and stop block is grooved as shown at 206 and guidably supports the push rod 184, which has an enlarged cylindrical shoulder portion 208 integrally formed intermediate the ends thereof. The shoulder 208 is received between the spaced walls of a cross-slot 210 extending transversely of and formed in the yoke-shaped upper end of the guide block for limiting the longitudinal movement of the push rod.

The left end of the push rod extending through the shock mount 186 is rounded as shown at 212 and is engaged by the movable core of the push-type solenoid actuator assembly 54 which provides a short powerful stroke of approximately 0.040 inch and 40 pounds of thrust. The actuator assembly includes a two-piece cup-shaped, non-magnetic housing 214 having a flanged base portion 216 with elongated slots as 218 therein by which it is adjustably positioned and secured to the sub-plate 134 by machine screws 220. The solenoid unit is secured to the housing by non-magnetic screws 222 and includes an electrically energizable, annular field coil 224, which is received on a bobbin 225 and surrounds a cylindrical, non-magnetic shaft 226 that is supported in spaced sleeve bushings 228 at opposite ends of the solenoid housing. Press-fitted on the shaft 226 is an annular armature ring 230 composed of magnetizable soft iron material received in an annular recess or cavity of the coil. Upon energization of the coil, the ring is attracted inwardly of the coil toward an iron washer 231, which forms part of the fixed coil mount, and carries therewith the reciprocable shaft 226, which is in contact with the rounded end 212 of the push rod 184 connected to the platen. A truncated cylindrical sleeve 232 of resilient material is bonded to the solenoid housing and the push rod housing to form a dust cover therefor. It will be noted that the actuator is devoid of any clutching and braking elements. By reason of its short stroke and rapidly energizable and de-energizable character, it is capable of faster operating rates and of providing reliable and longer service life than feeders using clutching and braking elements.

In assembly the push-rod housing and stop block, the stop block 182 is first secured in place on the sub-plate 134 after which the housing 162 is placed over the block and moved in a direction to position the central shoulder 208 of the push rod 184 against one side of the cross-slot 210 in the stop block. Further movement of the housing preloads the resilient mounts 165, 166, 186, and 187 until a desired initial tension is obtained. Then the housing is secured to the sub-plate by tightening the screws 179. The solenoid housing 214 is then moved in a direction toward the shock mount housing 162 until the outer terminal end of the armature shaft 226 is against the rounded end 212 of the push rod. The solenoid housing is then secured to the sub-plate by tightening the screws 220. With the feed belt in place around the pulley 102, rollers 112, 124 and 143 and against the platen 52, sub-plate 134 is moved in the direction of the stripper plate 32 until the outer peripheral surface of the belt is a distance slightly inside the terminal edges 156, 157 of the flanged portions of the stripper plate. The stripper plate is then secured to the pedestal 136 and bracket 150.

In the de-energized condition of the solenoid, the platen and feed belt will be located behind the forward edges 156, 157 of the flanged portion of the stripper plate and out of contact with the first card of the stack 12, which is urged leftwardly by the tensionsed pusher plate 36 against the flanged edges of the stripper plate. Energization of the solenoid coil from an external source of supply connected to the leads 240 thereof, attracts the armature ring 230 which moves the armature shaft 226 and push rod 184, and hence, the belt carrying platen, rightwardly toward the cards. The armature shaft is limited in its movement by the central shoulder 208 on the push rod limiting against the right side or wall of the cross-slot 210 in stop block 182. The width of the cross slot is such as to permit the feed belt carried by the platen to project a sufficient predetermined distance beyond the terminal edges 156, 157 of the flanged portion of the stripper plate to obtain the desired pressure of the belt against the cards, the pressure of the belt against the card being adjustable by movement of the sub-plate 134 on which the armature and push rod housings are mounted. By placing suitable tension on the belt through the adjustable pulley 112, the reach of the belt guided around the platen will follow the movement of the platen.

The engagement of the feed belt with the first card frictionally moves the card rearwardly of the hopper in the direction of and at the velocity of the belt, approximately 225 inches per second, and into the throat area defined between the tapered face of the separator block 161 and the rearward extentions 158, 159 of the flanged portions of the stripper plate. The separator block 161 is adjustably mounted on the hopper floor plate and acts as a fixed gap throat block with the rear rail extensions of the stripper plate when the belt is out of contact with the card stack, and as a frictional separator with the face of the belt when the belt is in feeding position permitting only one card to be fed through the throat gap, as previously mentioned. Should two cards be fed, the second card will strike the surface 242 of the block and will be held back thereby as it slips against the back surface of the first card whose front surface is in contact with the feed belt.

Figure 8:
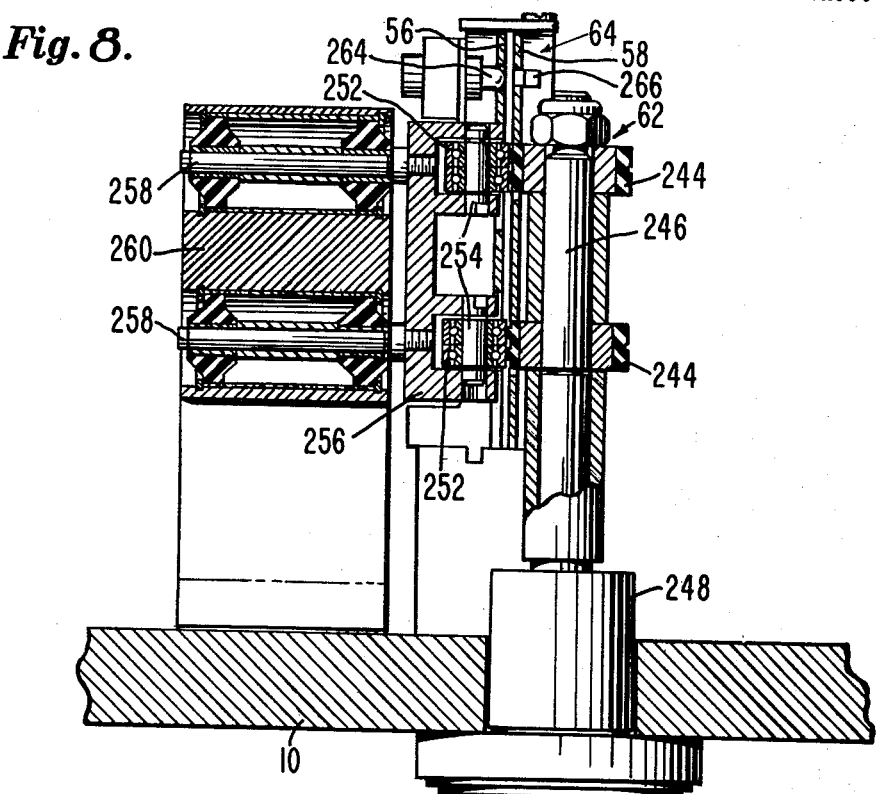
FIG. 8 is a sectional view taken in the plane 8—8 of FIG. 1.

As the first card enters the throat gap, it is presented to the bight of the card pull-out and accelerating drive roller assembly 62 shown in FIG. 8. The pull-out roller assembly includes a spaced pair of friction-faced drive rollers 244 mounted on a vertically extending shaft 246 that is journalied in a bearing block 248 secured to the base casting. Shaft 246 is driven in a clockwise direction by a flanged, toothed pulley 249 at its lower end through a toothed drive belt 250. In contact with the drive rollers is a spaced pair of idler rollers 252 in the form of anti-friction bearings rotatably mounted on fixed pintles 254 in a yoke-shaped housing 256. The housing 256 is supported on and connected to rods 258 which are resiliently mounted in the manner of push rod 184 in a shock mount housing 260 that is adjustably positionable and releasably secured to the base casting. The idler rollers, whose outer surfaces are formed by the steel outer races of anti-friction bearings, are of smaller diameter than the rubber tired surfaces of the driver rollers and are urged away from the power driven rollers as the card is presented into the bight thereof.

Fastened to the upper portion of the guide plates and located above the driver rollers and idler rollers of the pull-out driver assembly is a mounting for the lamp 264 horizontally projecting a light beam through an opening in guide plate 56 and across the card path upon a photoelectric light sensitive pick up device 266, such as a solar cell, positioned behind an opening in the guide plate 58. The beam is located in a vertical plane passing through the axial centers of the drive rollers and idler rollers of the pull-out driver assembly and is intercepted or interrupted by the leading edge of and over the length of a card being pulled through the pull-out driver assembly. The lamp and solar cell constitute the photo-electric card detector 64, which serves to detect the presence of a card in the bight of the pull-out drive roller assembly and to control the de-energization of the solenoid to retract the feed belt behind the stripper plate, thereby effectively disengaging the feed belt from the card stack and the feeding of a subsequent card. The fed card presented to the bight of the pull-out driver roller assembly will be driven thereby at approximately the aforementioned peripheral velocity of the feed belt and will be directed to the card reading station 18 where it is transported by the belt 65 around the turn around roller and into the card stacking bin or hopper 22.

Figure 9:
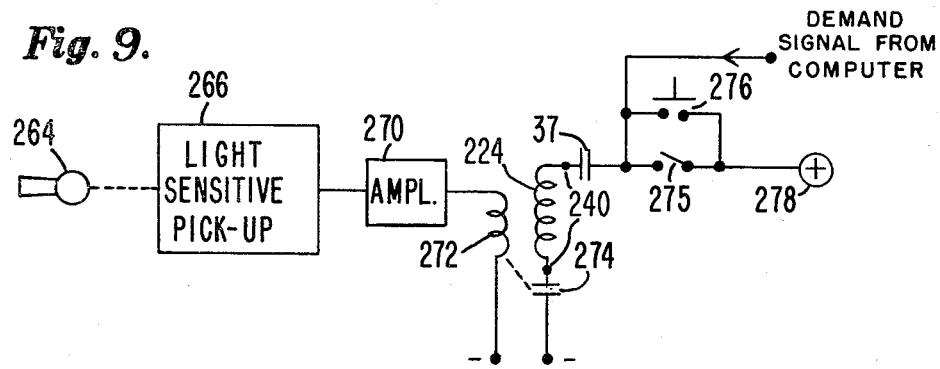
FIG. 9 is a simplified electrical control circuit diagram for controlling the operation of the feeder.

FIG. 9 illustrates a simplified control circuit that could be employed for controlling the operation of the solenoid. The light sensitive element 266 is shown connected to an amplifier 270 having a control relay 272 connected in the output thereof. The empty hopper switch 37 and the contacts 274 of the relay are shown connected in series with the solenoid coil 224 and a switch 275 or pushbutton 276 to a source of potential 278. With light from the lamp 264 impinging on the light sensitive element, the relay is energized closing its contacts to permit energization of the solenoid upon depression of the push button or receipt of a command signal from the computer. Upon interruption of the light beam by the reading edge of a card in the bight of the pull-out drive roller assembly, the relay will become de-energized to open its contacts and drop out the solenoid. Used with a data processing system the demand signal may be provided from a computer or central processor to control the energization of the solenoid actuator, which together with the feed belt carried by the movable platen, provides positive, even and reliable feeding and separation of the cards, one at a time upon demand at high speed and variable demand rates.

What is claimed is:

1. A document feeding apparatus for edgewise feeding of successive documents stacked in a feed hopper including an elongated stripper plate extending in the direction of feeding and defining a side wall of the hopper, means urging a stack of documents in the hopper against one side of the stripper plate, power driven endless belt means on the other side of the stripper plate, means moveable transversely of the stripper plate and supporting the belt for travel in a path in the direction of the longitudinal extent of the stripper plate, power operated actuator means coupled to the belt supporting means and operable to move it and the belt in a direction transversely of the stripper plate, and stop means located in the path of movement of said actuator means limiting the travel of the peripheral face of the belt a predetermined distance beyond the said one side of the stripper plate for frictional engagement with the face of the stack.

2. A document feeding apparatus for edgewise feeding of successive documents stacked in a feed hopper including an elongated stripper plate extending in the direction of feeding and defining a side wall of the hopper, means urging a stack of documents in the hopper against one side of the stripper plate, a power driven endless belt located on the other side of the stripper plate, means including a transversely moveable backing member supporting the belt for travel in a path in the direction of the longitudinal extent of the stripper plate, power operated actuator means coupled to the belt supporting backing member and operable to move it and the belt in a direction transversely of the stripper plate, and stop means located in the path of movement of said actuator means limiting the travel of the peripheral face of the belt a predetermined distance beyond the said one side of the stripper plate for frictional engagment with the face of the stack.

3. A document feeding apparatus for edgewise feeding of successive documents stacked in a feed hopper including an elongated stripper plate extending in the direction of feeding and defining a side wall of the hopper, means urging a stack of documents in the hopper against one side of the stripper plate, a power driven endless belt located on the other side of the stripper plate, means including a rigid, elongated backing member supporting the belt for travel in a path in the direction of the longitudinal extent of and moveable transversely of the stripper plate, power operated means including resiliently mounted, moveable actuator means coupled between the power operated means and the belt supporting backing member and operable to move it and the belt in a direction transversely of the stripper plate, and stop means located in the path of movement of said actuator means limiting the travel of the peripheral face of the belt a predetermined distance beyond the said one side of the stripper plate for frictional engagement with the face of the stack.

4. A document feeding apparatus in accordance with claim 3 above including means coupled to and controlling the operation of said power operated means.

5. A document feeding apparatus in accordance with claim 4 above wherein said power operated means is an electrically energizable solenoid connected to a source of operating potential through said control means.

6. A document feeding apparatus for feeding successive documents stacked in a feed hopper including a base plate, an elongated stripper plate mounted on the base plate and defining a side wall of the hopper, means urging a stack of documents in the hopper against one side of the stripper plate, a power driven endless belt on the other side of the stripper plate, means including a rigid backing member moveable transversely of the stripper plate and supporting the belt for travel in a path in the direction of the longitudinal extent of the stripper plate, power operated actuator means coupled to the belt supporting backing member and operable to move it and the belt in a direction transversely of the stripper plate, stop means located in the path of movement of said actuator means limiting the travel of the peripheral face of the belt a predetermined distance beyond the said one side of the stripper plate for frictional engagement with the face of the stack, and a mounting plate mounting said power operated actuator means, said belt supporting backing member and said stop means thereon and releasably secured to and adjustably positionable on the base plate transversely of the stripper plate to adjust the predetermined distance the peripheral face of the belt extends on the said other side of the stripper plate.

7. A document feeding apparatus for feeding successive documents stacked in a feed hopper including a base plate, an elongated stripper plate mounted on the base plate and having a spaced pair of lateral flanges on one side thereof defining an opening therein, means urging a stack of documents in the hopper toward one side of the stripper plate and against the terminal edges of the flanges thereof, a power driven endless belt positioned in the opening in the stripper plate, means including a resiliently mounted rigid backing member moveable transversely of the stripper plate and supporting the belt in the opening for travel in a path in the direction of the longitudinal extent of the stripper plate, power operated actuator means including a resiliently mounted push rod coupled to the actuator means and the belt supporting backing member and operable to move it and the belt in a direction transversely of the stripper plate, stop means located in the path of movement of said push rod limiting the travel of the peripheral face of the belt a predetermined distance beyond the said terminal flange edges of the stripper plate for frictional engagement with the face of the stack, and a mounting plate mounting said power operated actuator means, said resiliently mounted push rod, said resiliently mounted belt supporting backing member and said stop means thereon and releasably secured to and adjustably positionable on the base plate transversely of the stripper plate to adjust the predetermined distance the peripheral face of the belt extends beyond the terminal flange edges of the stripper plate.

8. A document feeding apparatus for feeding successive documents stacked in a feed hopper including an elongated stripper plate extending in the direction of feeding and having a spaced pair of lateral flanges on one side thereof defining an opening therein, means urging a stack of documents in the hopper toward one side of the stripper plate and against the terminal edges of the flanges thereof, a power driven endless belt positioned in the opening in the stripper plate, means including a resiliently mounted, rigid backing member moveable transversely of the stripper plate and supporting the belt in the opening for travel in a path in the direction of the longitudinal extent of the stripper plate, power operated actuator means including a resiliently mounted push rod coupled to the actuator means and the belt supporting backing member and operable to move it and the belt in a direction transversely of the stripper plate, stop means located in the path of movement of said push rod limiting the travel of the peripheral face of the belt a predetermined distance beyond the said terminal flange edges of the stripper plate for frictional engagement with the face of the stack, and a power driven drive roller assembly adjacent the feed exit of the hopper to receive the leading edge of a card fed by said belt and drivingly pull the card out of the hopper.

9. A card feeding apparatus for edgewise successive feeding of a stack of cards stacked in a feed hopper including an elongated stripper plate extending in the direction of feeding and defining a side wall of the hopper, means urging a stack of documents in the hopper against one side of the stripper plate, a power driven endless belt on the other side of the stripper plate, means including a rigid backing member supporting the belt for travelin a path in the direction of the longitudinal extent of the stripper plate and moveable transversely of the stripper plate, power operated actuator means coupled to the belt supporting backing member and operable to move it and the belt in a direction transversely of the stripper plate, stop means located in the path of movement of said actuator means limiting the travel of the peripheral face of the belt a predetermined distance beyond the said one side of the stripper plate for frictional engagement with the face of the stack, means coupled to and controlling the operation of said power operated means to position the belt in engagement with the stack, a power driven drive roller assembly positioned adjacent the feed exit of the hopper to receive the leading edge of a card still being fed and engaged by said belt, and card presence detecting control means detecting the presence of a card fed by the belt to the bight of the drive roller assembly and controlling the operation of said power operated means to retract the belt supporting backing member and the belt to the said other side of the stripper plate.

10. A card feeding apparatus in accordance with claim 9 above wherein said card presence detecting control means includes a source of illumination and a photo-optical light sensitive pickup element mounted on opposite sides of the feed path and in the axial plane of the drive roller assembly.

11. A document feeding apparatus for edgewise feeding of successive documents stacked in a feed hopper including an elongated stripper plate extending in the direction of feeding and defining a side wall of the hopper, means urging a stack of documents in the hopper against one side of the stripper plate, a power driven endless belt located on the other side of the stripper plate, rotatable belt supporting means mounted in fixed bearing mounts on the other side of the stripper plate for supporting and driving said belt, a transversely moveable elongated platen member located behind a reach of the belt extending in the direction of the longitudinal extent of the stripper plate and contacting the back of the belt, power operated actuator means coupled to the platen member and operable to move it and the aforesaid reach of the belt in a direction transversely of the stripper plate, and stop means located in the path of movement of said actuator means limiting the travel of the peripheral face of the belt a predetermined distance beyond the said one side of the stripper plate for frictional engagement with the face of the stack.

12. A document feeding apparatus in accordance with claim 11 above wherein said elongated platen member includes a longitudinally spaced pair of idler rollers rotatably mounted and carried thereon at the opposite extremities thereof around which the aforesaid reach of the belt is rotatably guided thereon.

13. A document feeding apparatus for edgewise feeding of successive documents stacked in a feed hopper out of the hopper and past the feed exit of the hopper including an elongated stripper plate extending in the direction of the feed path of feeding and defining a side wall of the hopper, means urging a stack of documents in the hopper against one side of the stripper plate, frictional separator means located in the feed exit of the hopper, a power driven endless belt on the other side of the stripper plate and having a reach portion extending into the feed exit of the hopper in the direction of the longitudinal extent of the stripper plate, a transversely moveable elongated platen member located behind the aforesaid reach portion of the belt and extending into the feed exit of the hopper, power operated actuator means coupled to the platen member and operable to move it and the aforesaid reach portion of the belt in a direction transversely of the stripper plate, and stop means located in the path of movement of said actuator means limiting the travel of the peripheral face of the belt a predetermined distance beyond the said one side of the stripper plate for frictional engagement with the face of the stack.

14. A card feeding apparatus for edgewise successive feeding of a stack of tabulating cards having rows of perforations therein including a hopper floor on which said cards are supported in a longitudinal edgewise vertical attitude thereon, an elongated stripper plate extending in the direction of feeding and defining a side wall of the hopper, means urging a stack of cards in the hopper against one side of the stripper plate, a power driven endless belt located on the other side of the stripper plate normally holding said stack of cards out of contact with said belt, said feed belt having a reach portion extending in the direction of the longitudinal extent of the stripper plate and a ribbed surface comprising longitudinally extending projecting ridges separated by a groove of the same width as the ridges and approximately equal to the length of a perforation in the card, means including a rigid, elongated backing member supporting the belt for travel in a path in the direction of the longitudinal extent of and moveable transversely of the stripper plate, said supporting means supporting the belt above the hopper floor a distance relative to the location of the rows of perforations in the cards with the ridges of the belt aligned between adjacent rows of perforations in the card and the groove of the belt aligned with a row of perforations in the card, and power operated moveable actuator means coupled to the belt supporting backing member and operable to move it and the aforesaid reach portion of the belt in a direction transversely of the stripper plate to contact the face of a card.

References Cited in the file of this patent
UNITED STATES PATENTS

| | | |
|---|---|---|
| 1,136,960 | Ielfield | Apr. 27, 1915 |
| 2,856,187 | Burckhardt et al. | Oct. 14, 1958 |
| 3,089,697 | Brozo | May 14, 1963 |